US008560185B2

(12) United States Patent
Narazaki et al.

(10) Patent No.: US 8,560,185 B2
(45) Date of Patent: Oct. 15, 2013

(54) CONTROL UNIT FOR CONSTRUCTION MACHINE

(75) Inventors: Akihiro Narazaki, Tsuchiura (JP); Hideo Karasawa, Tsuchiura (JP); Tsuyoshi Nakamura, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/816,820

(22) PCT Filed: Oct. 12, 2011

(86) PCT No.: PCT/JP2011/073439
§ 371 (c)(1),
(2), (4) Date: Feb. 13, 2013

(87) PCT Pub. No.: WO2012/050136
PCT Pub. Date: Apr. 19, 2012

(65) Prior Publication Data

US 2013/0190994 A1 Jul. 25, 2013

(30) Foreign Application Priority Data

Oct. 13, 2010 (JP) ................................ 2010-230874

(51) Int. Cl.
*G06F 7/70* (2006.01)

(52) U.S. Cl.
USPC ............................................ 701/50; 701/54

(58) Field of Classification Search
USPC .................................................... 701/50, 54
See application file for complete search history.

(56) References Cited

U.S. PATENT DOCUMENTS

| | | | | |
|---|---|---|---|---|
| 7,277,785 | B2 * | 10/2007 | Strosser et al. | 701/50 |
| 2003/0144111 | A1 * | 7/2003 | Kato | 477/92 |
| 2005/0014603 | A1 * | 1/2005 | Brome et al. | 477/38 |
| 2007/0159354 | A1 * | 7/2007 | Rosenberg | 340/902 |
| 2008/0150751 | A1 * | 6/2008 | Sala et al. | 340/870.02 |
| 2010/0242195 | A1 * | 9/2010 | Day et al. | 15/49.1 |
| 2011/0267184 | A1 * | 11/2011 | Lee | 340/435 |

FOREIGN PATENT DOCUMENTS

| | | | |
|---|---|---|---|
| JP | 01-155044 | A | 6/1989 |
| JP | 01-200041 | A | 8/1989 |
| JP | 02-125946 | A | 5/1990 |
| JP | 09-68169 | A | 3/1997 |
| JP | 2002-256932 | A | 9/2002 |

OTHER PUBLICATIONS

International Preliminary Report on Patentability received in International Application No. PCT/JP2011/073439 dated May 16, 2013.

* cited by examiner

*Primary Examiner* — Hussein A. Elchanti
(74) *Attorney, Agent, or Firm* — Mattingly & Malur, PC

(57) ABSTRACT

A target speed setting section sets a target speed of an engine to an idle speed that is lower than an input speed with an engine control dial when no operating signal is output from a control lever over a predetermined period of time. A speed control section controls the speed of the engine based on the target speed set by the target speed setting section, which includes an idle speed setting section that corrects the idle speed according to values detected by sensors so that reduction in an output of the engine due to a change in a state quantity associated with an environment under which the engine is placed can be inhibited. This allows a good operating condition to be achieved during a reset from an auto idle state even with an engine output has been reduced according to a change in environment.

11 Claims, 5 Drawing Sheets

CONTROL UNIT FOR CONSTRUCTION MACHINE

TECHNICAL FIELD

The present invention relates to a control unit for a construction machine that controls to reduce an engine speed to an idle speed when an operating device is placed in a neutral position.

BACKGROUND ART

In general, construction machines, such as hydraulic excavators, incorporate a speed input device (e.g. an engine control dial) that is used to direct speed of an engine (diesel engine). An operator operates the speed input device to thereby set a target speed for the engine. In such a construction machine, control (auto idle control) is performed so as to set the engine speed to a value (idle speed) smaller than the speed directed by the speed input device when a predetermined period of time elapses after all of operating devices (control levers) that direct operation of a hydraulic actuator (a driven member) are held in neutral positions. Reduction in fuel consumption (hereinafter may be referred to as fuel efficiency) or noise, for example, is thereby achieved.

A known technique relating to the construction machine that performs the auto idle control is intended to prevent, for example, black smoke from occurring or fuel efficiency from being reduced. Such a problem arises from a difference in response between the engine speed and a capacity of a hydraulic pump (a tilting angle) involved when the two are to be increased (see, for example, Patent Document 1). To achieve the foregoing object, the abovementioned technique makes small the engine speed and the capacity of the hydraulic pump during the auto idle control and, when the auto idle state is thereafter restored to a normal operating state, brings back the engine speed and, after the lapse of a predetermined period of time, brings back the capacity of the hydraulic pump.

PRIOR ART DOCUMENTS

Patent Document

Patent Document 1: JP,A9-68169

SUMMARY OF THE INVENTION

Problem to be Solved by the Invention

Engines in construction machines produce outputs that vary depending on environment in which the engines are placed. For example, if the construction machine is operated in high altitudes, a reduced engine output results due to reduced atmospheric pressure. If load is suddenly applied to the engine by, for example, operating the hydraulic actuator during a reset from the auto idle state, a phenomenon (lug-down) may at times occur in which the engine speed is reduced by supply of fuel that is not in time for a need. If the reduced atmospheric pressure causes the engine output to be reduced as described above, reduction in the engine speed due to the lug-down may become severer than on a level ground and, in some cases, the engine may stall. Such a change in the engine output occurs when engine coolant temperature or fuel temperature changes, in addition to when the atmospheric pressure changes.

An object of the present invention is to provide a control unit for a construction machine that can maintain a good operating feel during a reset from an auto idle state even with an engine output reduced according to a change in environment.

Means for Solving the Problem (1) To achieve the foregoing object, an aspect of the present invention provides a control unit for a construction machine. The construction machine includes: an engine; a hydraulic pump driven by the engine; a hydraulic actuator driven by hydraulic fluid delivered from the hydraulic pump; a valve for controlling flow of the hydraulic fluid supplied from the hydraulic pump to the hydraulic actuator; an operating device for controlling the valve by outputting an operation signal that varies according to an operation amount; means for detecting a state quantity associated with an environment of the engine; and means for inputting speed of the engine. The control unit includes: a section for setting a target speed of the engine to an idle speed that is lower than the speed input by the speed input means when the operating device does not output the operation signal after a lapse of a predetermined period of time; and a section for controlling speed of the engine based on the target speed set by the target speed setting section. In the control unit, the target speed setting section includes an idle speed setting section for correcting the idle speed according to a value detected by the detecting means so that an output of the engine can be prevented from being reduced due to a change in the state quantity.

(2) In (1) above, preferably, the detecting means includes means for detecting atmospheric pressure; and the idle speed setting section corrects the idle speed such that the idle speed increases with reduction in the atmospheric pressure detected by the pressure detecting means.

(3) In (1) or (2) above, preferably, the detecting means includes means for detecting a coolant temperature of the engine; and the idle speed setting section corrects the idle speed such that the idle speed increases with reduction in the coolant temperature detected by the coolant temperature detecting means.

(4) In any one of (1) to (3) above, preferably, the detecting means includes means for detecting a fuel temperature of the engine; and the idle speed setting section corrects the idle speed such that the idle speed increases with reduction in the fuel temperature detected by the fuel temperature detecting means when the fuel temperature detected by the fuel temperature detecting means is a first set value or less, and that the idle speed increases with an increase in the fuel temperature detected by the fuel temperature detecting means when the fuel temperature is a second set value or more, the second set value being set to be greater than the first set value.

(5) In any one of (1) to (4) above, preferably, the control unit further includes: means for selecting whether to enable or disable the target speed setting section to set the target speed of the engine to the idle speed when the operating device does not output the operation signal over a predetermined period of time.

Effect of the Invention

In the aspect of the present invention, lug-down can be lightened even with reduction in the engine output that may occur according to changes in the environment. A good operating feel can thus be maintained during a reset from the auto idle state.

MODES FOR CARRYING OUT THE INVENTION

An embodiment of the present invention will be described below with reference to the accompanying drawings.

Figure 1:
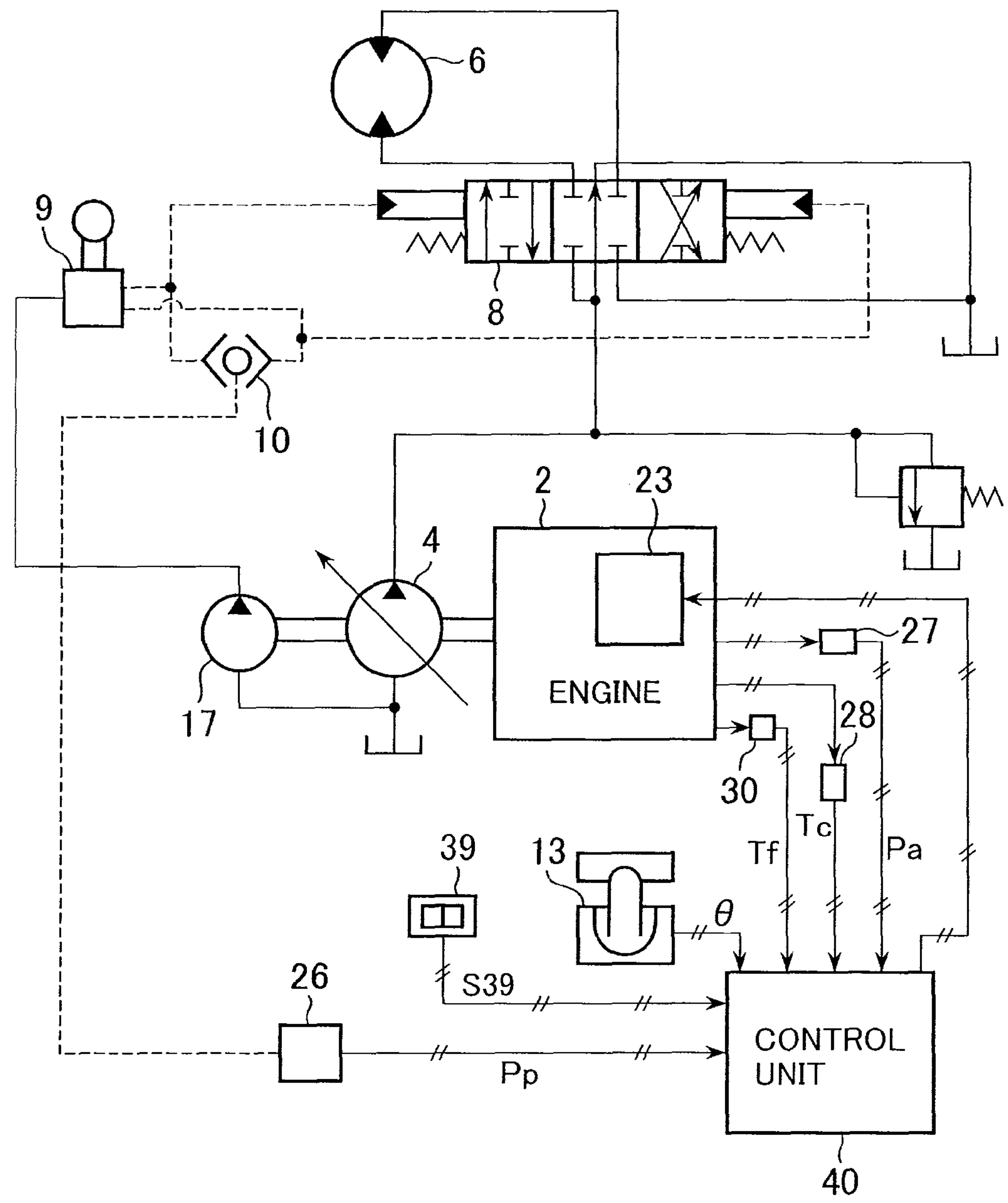
FIG. 1 is a configuration diagram showing schematically a construction machine according to an embodiment of the present invention.

FIG. 1 is a configuration diagram showing schematically a construction machine according to an embodiment of the present invention. The construction machine shown in this figure includes an engine 2 (diesel engine) 2, a hydraulic pump 4, an auxiliary hydraulic pump 17, a hydraulic actuator 6, a directional control valve 8, a control lever (operating device) 9, a pressure sensor 27, a temperature sensor 28, a temperature sensor 30 (detecting means), an engine control dial (speed input means) 13, and a control unit 40. Specifically, the engine 2 is what is called an electronic control type. The hydraulic pump 4, a variable displacement type, is mechanically connected to an output shaft of the engine 2 and driven by the engine 2. The auxiliary hydraulic pump 17 is driven by the engine 2. The hydraulic actuator 6 is driven by hydraulic fluid delivered from the hydraulic pump 4. The directional control valve 8 is a pilot type and controls flow (direction and flow rate) of the hydraulic fluid delivered from the hydraulic pump 4 to the hydraulic actuator 6. The control lever 9 uses the hydraulic fluid from the auxiliary hydraulic pump 17 and outputs an operation signal (hydraulic signal) that varies according to an operation amount, thereby changing the direction in which the directional control valve 8 is operated. The pressure sensor 27, the temperature sensor 28, and the temperature sensor 30 detect state quantities associated with an environment in which the engine 2 is placed. The engine control dial 13 inputs speed of the engine 2. The control unit 40 controls the engine 2.

The engine control dial 13 (hereinafter may be referred to an EC dial) is a speed input device with which an operator inputs a target speed of the engine 2. The EC dial 13 is disposed in a cab of a hydraulic excavator. The target speed of the engine 2 can be input by adjusting an angle of the dial (dial angle) θ. In the description that follows, the speed input with the EC dial 13 may be referred to as an input speed. It is noted that other speed input devices may include a throttle lever.

The pressure sensor 27, the temperature sensor 28, the temperature sensor 30, the EC dial 13, an operating pressure sensor 26, and an auto idle enable switch 39 are connected to the control unit 40. Signals output from these are input to the control unit 40.

The pressure sensor 27 is means for detecting atmospheric pressure. The temperature sensor 28 is means for detecting temperature of coolant of the engine 2. The temperature sensor 30 is means for detecting temperature of fuel of the engine 2. The operating pressure sensor 26 detects the operation signal (hydraulic signal) output from the control lever 9 to the directional control valve 8. It is noted that the operating pressure sensor 26 according to the embodiment detects as the operation signal pressure of the hydraulic fluid that has flowed past a shuttle valve 10. This is because of the following reason. Specifically, a maximum pressure of the hydraulic pressure applied to the directional control valve 8 according to an operation (a tilting direction and a tilting amount) of the control lever 9 is input to the sensor 26 via the shuttle valve 10 and the same pressure as that of the hydraulic fluid that has flowed past the shuttle valve 10 acts on the directional control valve 8 as the operation signal.

The auto idle enable switch 39 is a device (selecting means) for selecting whether to enable the control unit 40 to perform an auto idle control. The "auto idle control" forcedly sets the target speed of the engine 2 to a speed lower than a speed input from the EC dial 13 (an idle speed) when no operation signal is output from the control lever 9 to the directional control valve 8 even after the lapse of a predetermined period of time (specifically, over the predetermined period of time) and it is then determined that all of the control lever 9 is held in a neutral position. For the hydraulic excavator, preferably, the auto idle enable switch 39 is disposed inside the cab.

The auto idle control is automatically performed if it is determined that no operation signal is output from the control lever 9 even after the lapse of the predetermined period of time with the switch 39 placed in an ON position. In contrast, if the switch 39 is placed in an OFF position, the auto idle control is not performed even if it is determined that no operation signal is output from the control lever 9 even after the lapse of the predetermined period of time.

It is to be noted that, although FIG. 1 shows a hydraulic motor as an exemplary symbol for the hydraulic actuator 6, any other type of actuator (e.g. a hydraulic cylinder) may be used.

Figure 2:
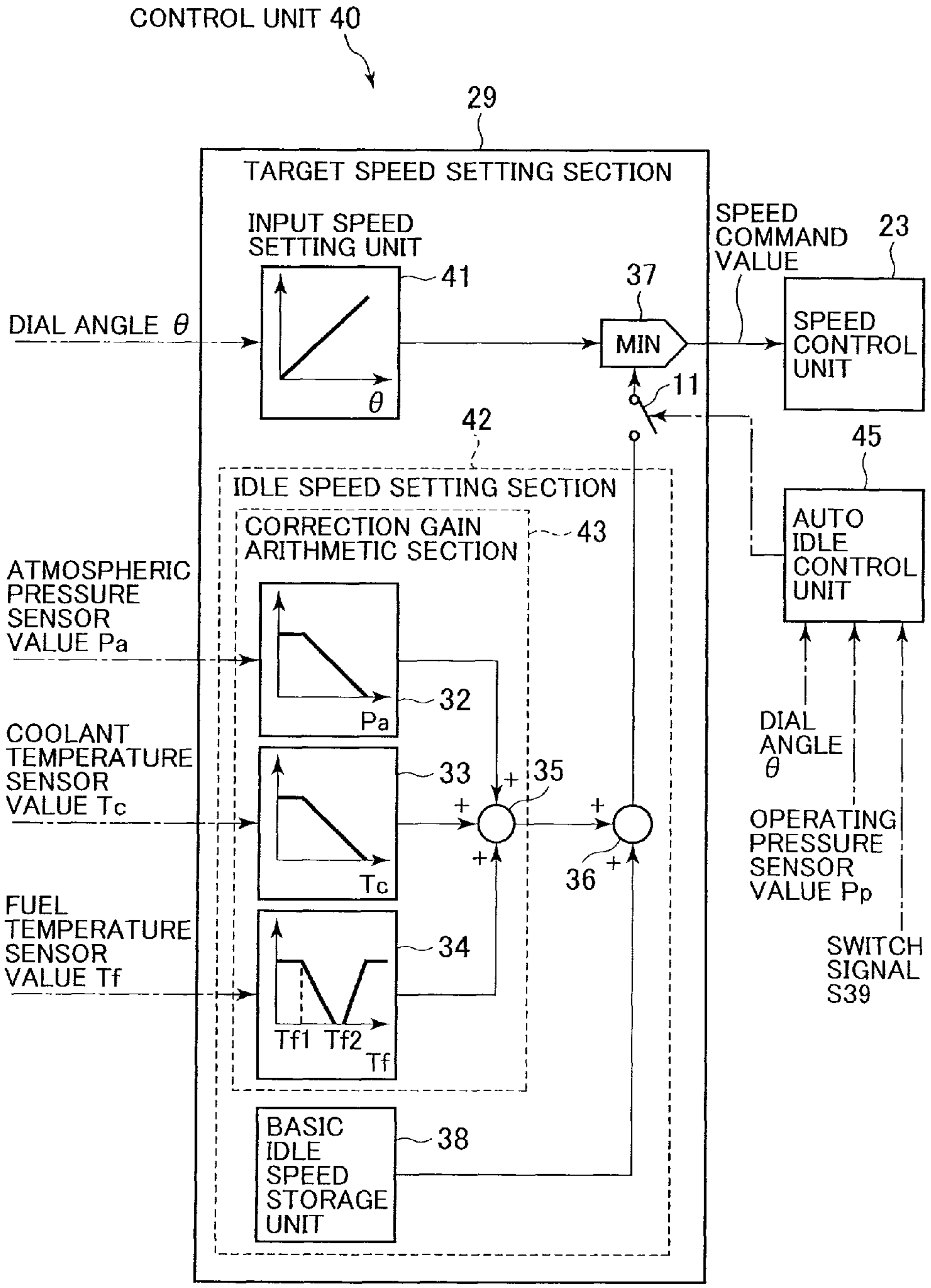
FIG. 2 is a configuration diagram showing schematically a control unit 40 according to the embodiment of the present invention.

FIG. 2 is a configuration diagram showing schematically the control unit 40 according to the embodiment of the present invention. The control unit 40 shown in the figure includes an auto idle control section 45, a target speed setting section 29, and a speed control section 23. The control unit 40 further includes a storage unit (not shown), such as ROM and RAM, for storing details and results of processing, and a processing unit (not shown), such as a CPU, for performing processing stored in the storage unit.

The auto idle control section 45 controls start and stop of the auto idle control. The auto idle control section 45 according to the embodiment controls the start and stop of the auto idle control by switching between enabling and disabling the target speed setting section 29 to use the idle speed set by an idle speed setting section 42 as the target speed of the engine 2. More specifically, the auto idle control section 45 of this embodiment controls the start and stop of the auto idle control by switching between ON and OFF positions of an auto idle start switch 11 disposed between a minimum value selecting section 37 and a second adder 36. In addition, a switch signal S39 output from the auto idle enable switch 39, an operating pressure sensor value Pp output from the operating pressure sensor 26, and the dial angle θ output from the EC dial 13 are input to the auto idle control section 45 of this embodiment.

Figure 3:
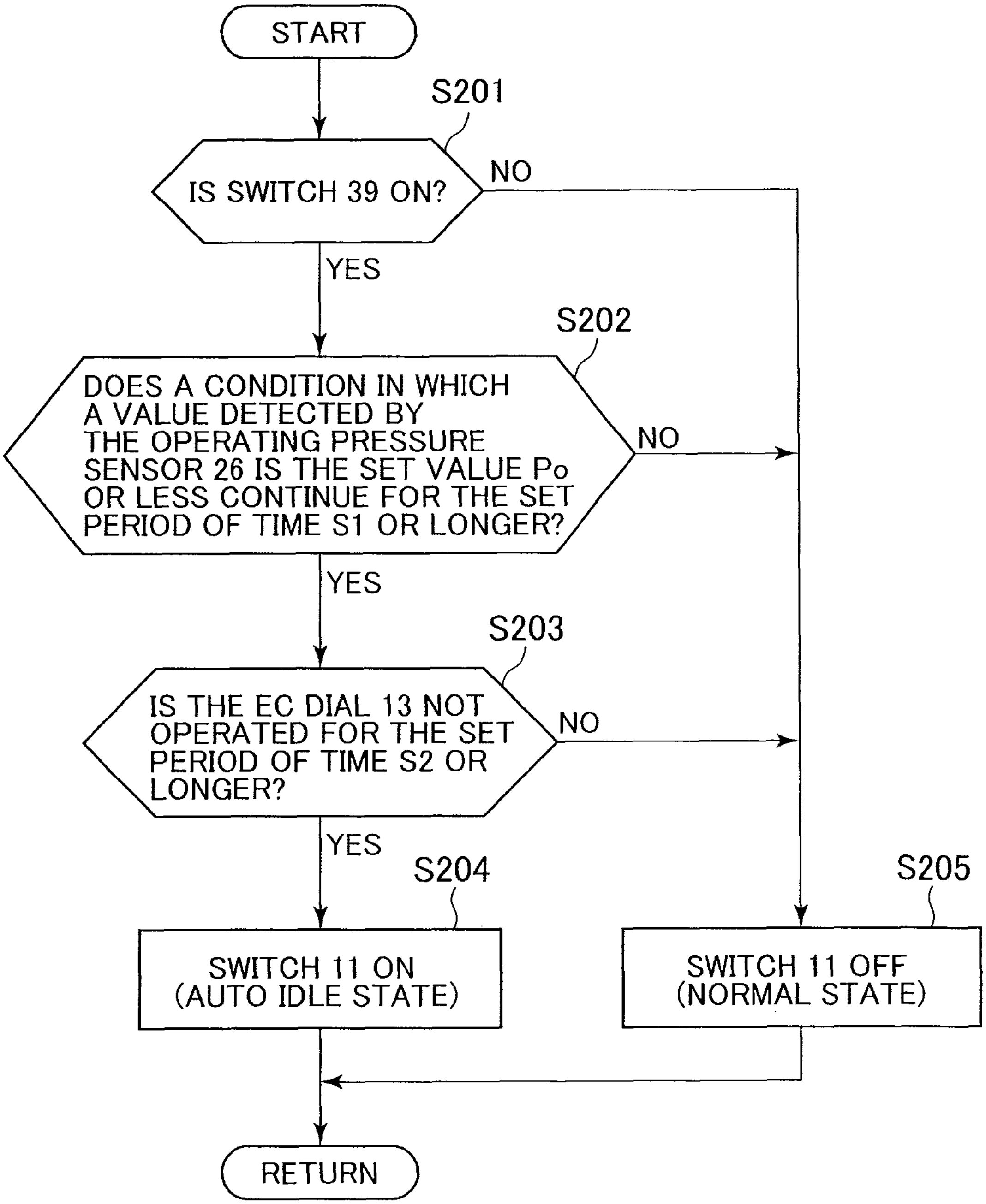
FIG. 3 is a flowchart showing processing performed by an auto idle control section 45 for controlling a switch according to the embodiment of the present invention.

FIG. 3 is a flowchart showing processing performed by the auto idle control section 45 for switch control according to the embodiment of the present invention. As shown in this figure, the auto idle control section 45 first determines whether the auto idle enable switch 39 is placed in the ON position based on the switch signal S39. If it is determined that the auto idle enable switch 39 is placed in the ON position, the operation proceeds to S202.

In S202, the auto idle control section 45 determines whether a condition in which the control lever 9 is held in the neutral position (in which the hydraulic actuator 6 is not actuated) lasts continuously for a set period of time S1 or longer. In this embodiment, the foregoing condition is determined according to whether a condition in which the operating pressure sensor value Pp of the operating pressure sensor 26 is a set value Po or less lasts continuously for the set period of time S1. The reason for the wait for the set period of time S1 is to prevent the auto idle control from being mistakenly performed due to an extremely brief period of time involved during which the operation amount is zero when, for example, the operator places the control lever 9 into an opposite position across the neutral position. It is noted that preferably the set value Po that serves as a reference in the processing of S202 is set to be smaller than a pressure with which the directional control valve 8 starts moving because of the hydraulic pressure output from the control lever 9.

If it is determined in S202 that the control lever 9 is held in the neutral position continuously for the set period of time S1 or longer, the auto idle control section 45 determines whether a condition in which the EC dial 13 is not operated lasts continuously for a set period of time S2 or longer (S203). In this embodiment, the foregoing condition is determined according to whether a condition in which a value of the dial angle θ output from the EC dial 13 is held for the set period of time S2 or longer.

If it is determined in S203 that the condition in which the EC dial 13 is not operated lasts continuously for the set period of time S2 or longer, the auto idle control section 45 introduces a delay by a predetermined period of time Se before placing the auto idle start switch 11 in the ON position (S204). This causes the idle speed calculated by the idle speed setting section 42 to be output to the minimum value selecting section 37, which enables the target speed setting section 29 to use the idle speed as the target speed of the engine 2. When S204 is completed, the operation returns to S201 and processing of S201 and onward is repeated.

If it is determined in S201 that the auto idle enable switch 39 is placed in the OFF position, the auto idle start switch 11 is immediately placed in the OFF position (S205), provided that the control lever 9 is not in the neutral position continuously for the set period of time S1 or longer as determined in S202 or that the value of the dial angle θ of the EC dial 13 is not held for the set period of time S2 or longer as determined in S203. This results in the idle speed calculated by the idle speed setting section 42 being no longer output to the minimum value selecting section 37. This prohibits the target speed setting section 29 from using the idle speed as the target speed of the engine 2. When S205 is completed, the operation returns to S201 and processing of S201 and onward is repeated.

It is noted that the embodiment includes the auto idle enable switch 39 in order to achieve performance of the auto idle control according to an intention of the operator. The construction machine may omit the auto idle enable switch 39 and may still be configured so as to allow the auto idle control to be performed at any time. In addition, in this embodiment, the condition for performing the auto idle control includes one in which time over which the EC dial 13 is not operated extends over the set period of time S2 or longer. This condition may nonetheless be omitted. Specifically, the auto idle control may be performed only on the condition of the control lever 9.

Referring back to FIG. 2, the target speed setting section 29 sets the target speed of the engine 2. The target speed setting section 29 includes an input speed setting unit 41, the idle speed setting section 42, and the minimum value selecting section 37.

The input speed setting unit 41 calculates the target speed (input speed) used under normal conditions based on the dial angle θ of the EC dial 13. The input speed setting unit 41 receives an input of the dial angle θ from the EC dial 13. As shown in the table in FIG. 2, the input speed calculated in the input speed setting unit 41 is proportional to the dial angle θ and calculated so as to increase with the dial angle θ. The input speed calculated here is output to the minimum value selecting section 37.

Figure 5:
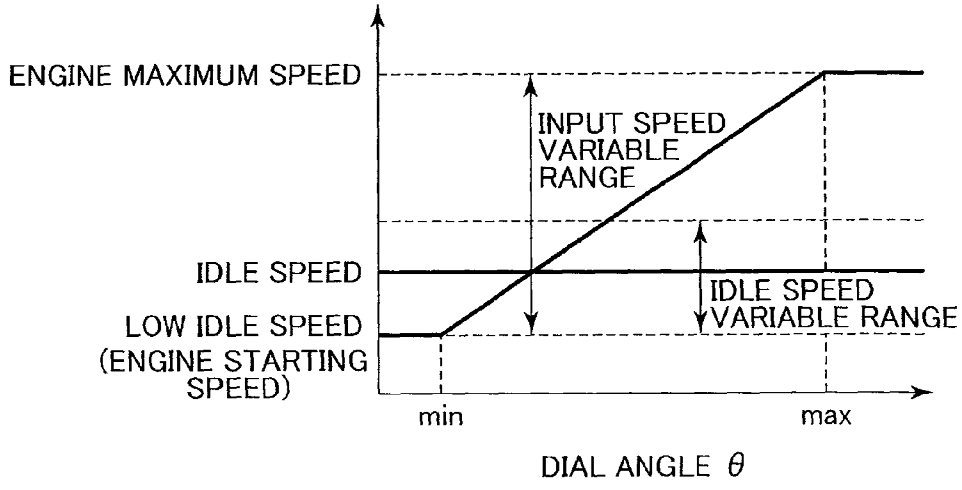
FIG. 5 is a graph showing an exemplary relationship between the target speed calculated by an input speed setting unit 41 and a dial angle θ according to the embodiment of the present invention.

A specific example of the target speed calculated by the input speed setting unit 41 will be described below with reference to a drawing. FIG. 5 is a graph showing an exemplary relationship between the target speed calculated by the input speed setting unit 41 and the dial angle θ. As shown in the figure, the target speed is set to a minimum value when the dial angle θ is the smallest and to a maximum value when the dial angle θ is the largest. In addition, in the example shown in the figure, the minimum value of the target speed is set to speed (a low idle speed) at engine starting (low idle) and the maximum value of the target speed is set to an engine maximum speed.

The idle speed setting section 42 sets the engine speed (idle speed) when the auto idle control is performed. The idle speed setting section 42 includes a basic idle speed storage unit 38, a correction gain arithmetic section 43, a first adder 35, and the second adder 36. The idle speed calculated by the idle speed setting section 42 is corrected with a correction gain calculated by the correction gain arithmetic section 43 according to values detected by the sensors 27, 28, 30, so that the output of the engine 2 can be prevented from being reduced due to changes in the state quantities associated with the environment of the engine 2 (atmospheric pressure, coolant temperature, fuel temperature). As evident from the configuration shown in FIG. 2, the idle speed set by the idle speed setting section 42 is different from the target speed set by the input speed setting unit 41.

The basic idle speed storage unit 38 stores speed (basic idle speed) that serves as a reference for setting the idle speed. From the standpoint of reducing the fuel consumption, preferably the basic idle speed is set as follows. Specifically, for example, the control lever 9 is operated on a level ground under a predetermined temperature condition and the engine speed is brought back to the target speed set with the EC dial 13. At this time, preferably the lowest engine speed is set as the basic idle speed, of engine speeds at which torque can be generated such that the engine does not stall even when load of the hydraulic actuator 6 operated by the operation of the control lever 9 suddenly acts. The basic idle speed storage unit 38 outputs the basic idle speed stored therein to the second adder 36.

It is noted that, in consideration of the foregoing point, the basic idle speed is preferably set based on performance of, for example, engine output torque. Setting methods of this sort include, for example, setting the basic idle speed at a relatively high level for a type of engine that produces a relatively low output torque of a low speed range and setting the basic idle speed at a relatively low level for a type of engine that produces a relatively high output torque of the low speed range.

The correction gain arithmetic section 43 calculates the correction gain to be applied to the basic idle speed. The correction gain arithmetic section 43 includes a first arithmetic unit 32, a second arithmetic unit 33, and a third arithmetic unit 34.

The first arithmetic unit 32 calculates the correction gain based on an atmospheric pressure sensor value Pa output from the pressure sensor 27. As shown in the table in FIG. 2, the first arithmetic unit 32 calculates the correction gain so that the idle speed increases with reduction in the atmospheric pressure sensor value Pa detected by the pressure sensor 27. Specifically, in general, the lower the atmospheric pressure, the more the reduction in the engine output. The first arithmetic unit 32 therefore calculates the correction gain so that the lower the atmospheric pressure, the higher the idle speed. The correction gain calculated in the first arithmetic unit 32 is output to the first adder 35.

The second arithmetic unit 33 calculates the correction gain based on a coolant temperature sensor value Tc output from the temperature sensor 28. As shown in the table in FIG. 2, the second arithmetic unit 33 calculates the correction gain so that the idle speed increases with reduction in the coolant temperature sensor value Tc detected by the temperature sensor 28. Specifically, in general, the lower the coolant temperature, the more the reduction in the engine output. The second arithmetic unit 33 therefore calculates the correction gain so that the lower the coolant temperature, the higher the idle speed. The correction gain calculated in the second arithmetic unit 33 is output to the first adder 35.

The third arithmetic unit 34 calculates the correction gain based on a fuel temperature sensor value Tf output from the temperature sensor 30. As shown in the table in FIG. 2, the third arithmetic unit 34 calculates the correction gain so that the idle speed increases with reduction in the fuel temperature when the fuel temperature sensor value Tf is a first set value Tf1 or less (specifically, the correction gain to be calculated increases with reduction in the fuel temperature). Similarly, the third arithmetic unit 34 calculates the correction gain so that the idle speed increases with an increase in the fuel temperature when the fuel temperature sensor value Tf is a second set value Tf2 or more, the second set value Tf2 being set to be greater than the first set value Tf1 (specifically, Tf1<Tf2) (specifically, the correction gain to be calculated increases with the increase in the fuel temperature). In general, the engine output decreases with reduction in the fuel temperature in a low temperature range (Tf1 or less in this embodiment), while the engine output decreases with an increase in the fuel temperature in a high temperature range (Tf2 or more in this embodiment). The third arithmetic unit 34 therefore calculates the correction gain so as to prevent the engine output from being reduced based on such a relationship between the fuel temperature and the engine output. The correction gain calculated by the third arithmetic unit 34 is output to the first adder 35.

The first adder 35 adds up correction gains output from the first arithmetic unit 32, the second arithmetic unit 33, and the third arithmetic circuit 34 (the sum of the correction gains may hereinafter be referred to as a total correction gain). It is noted that the total correction gain may be calculated by appropriately weighting each of the correction gains output from the arithmetic unit 32, 33, 34. The total correction gain calculated by the first adder 35 is output to the second adder 36.

The second adder 36 adds the total correction gain output from the first adder 35 to the basic idle speed output from the basic idle speed storage unit 38 to calculate the idle speed. The idle speed calculated by the second adder 36 is output to the minimum value selecting section 37 only when the auto idle start switch 11 is in the ON position.

It is noted that a variable range of the idle speed set by the idle speed setting section 42 in this embodiment has a lower limit that is the minimum value of the target speed set by the input speed setting unit 41. Specifically, in the example shown in FIG. 5, the lower limit value of the idle speed coincides with the low idle speed. Setting the lower limit value of the variable range of the idle speed in this manner allows the idle speed to be reduced down to the low idle speed at engine starting.

The minimum value selecting section 37 compares the input speed output from the input speed setting unit 41 with the idle speed output from the idle speed setting section 42 (the second adder 36) to thereby set whichever is the smaller value as an actual target speed of the engine 2. The minimum value selecting section 37 also outputs a speed command value for achieving the set target speed to the speed control section 23. Specifically, the auto idle functions in this embodiment only when the target speed determined by the input speed setting unit 41 based on the dial angle θ of the EC dial 13 is set to be greater than the idle speed set by the idle speed setting section 42. It is noted that, if the low idle speed is set by the idle speed setting section 42 when the low idle speed is also set by the input speed setting unit 41 (if the dial angle θ is the minimum in FIG. 5), the low idle speed is to be output to the speed control section 23.

The speed control section 23 controls the speed of the engine 2 based on the target speed set by the target speed setting section 29. The speed control section 23 is disposed in the engine 2 according to this embodiment (see FIG. 1). The speed control section 23 receives an input of a speed command value from the target speed setting section 29. The speed control section 23 controls the speed of the engine 2 based on the speed command value.

Figure 4:
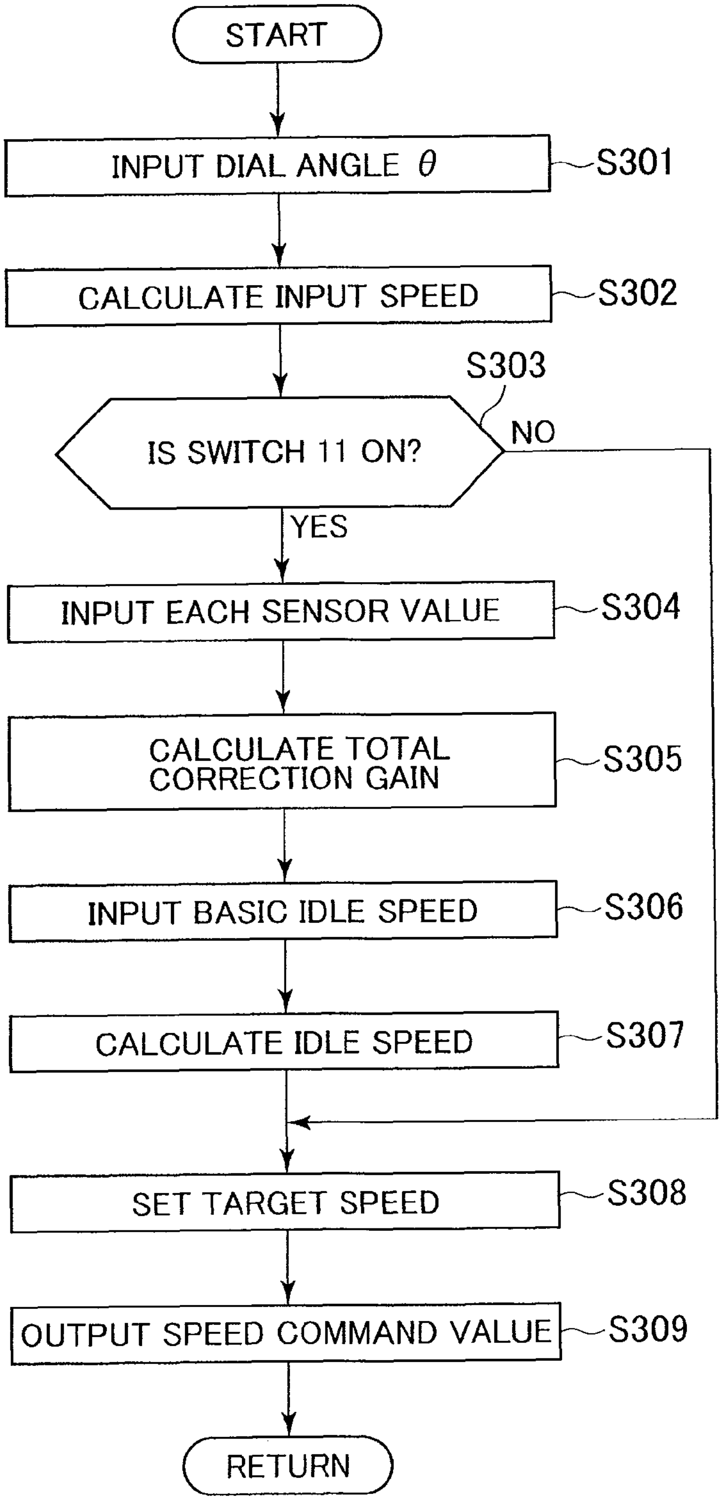
FIG. 4 is a flowchart showing processing performed by a target speed setting section 29 for setting a target speed according to the embodiment of the present invention.

FIG. 4 is a flowchart showing processing performed by the target speed setting section 29 for setting the target speed according to the embodiment of the present invention. Referring to this figure, the input speed setting unit 41 of the target speed setting section 29 uses the dial angle θinput via the EC dial 13 (S301) as a basis for setting the input speed (S302).

If it is determined in S303 that the auto idle start switch 11 is placed in the OFF position, only the input speed is being output to the minimum value selecting section 37, so that the target speed setting section 29 sets the input speed as the target speed (S308) and outputs the speed command value to the speed control section 23 (S309). This causes the engine 2 to be controlled under normal conditions (specifically, the engine 2 is rotated at speed (input speed) input with the EC dial 13). When S309 is completed, the operation returns to S301 and processing of S301 and onward is repeated.

If it is determined in S303 that the auto idle start switch 11 is placed in the ON position, the idle speed setting section 42 uses the arithmetic unit 32, 33, 34 of the correction gain arithmetic section 43 to receive inputs of the values detected by the sensors 27, 28, 30 (S304) and uses the first adder 35 to calculate the total correction gain (S305). The idle speed setting section 42 then inputs the basic idle speed stored in the basic idle speed storage unit 38 to the second adder 36 (S306) and adds the total correction gain calculated in S305 to the basic idle speed to arrive at an idle speed (S307). The idle speed calculated by the idle speed setting section 42 is compared with the input speed calculated in S302 by the minimum value selecting section 37. Whichever is the smaller of the two is then set as the target speed (S308) and output to the speed control section 23 (S309). Normally, the idle speed is set as the target speed in S308, which allows the engine 2 to be controlled in the auto idle state. When S309 is completed, the operation returns to S301 and processing of S301 and onward is repeated.

In the construction machine having arrangements as described heretofore, when the auto idle start switch 11 is placed in the ON position by the control unit 40, the auto idle control is started after the lapse of the predetermined period of time Se from that particular point in time. The speed of the engine 2 is then reduced from what is specified with the EC dial 13 (input speed) to what is set by the idle speed setting section 42 (idle speed). In general, engine outputs vary according to the environment (environmental factors including the atmospheric pressure, coolant temperature, and the fuel temperature). In the construction machine having arrangements as described above, however, the idle speed is corrected so that the engine output can be prevented from being reduced due to changes in the environment. Specifically, correction gains are calculated based on the sensor values of the pressure sensor 27, the temperature sensor 28, and the temperature sensor 30. Use of the idle speed that incorporates corrections made with the correction gains allows the engine output to be retained even with the changes in the environment. In the embodiment, therefore, lug-down can be lightened even with reduction in the engine output that may occur according to the changes in the environment. A good operating feel can thus be maintained during a reset from the auto idle state.

Additionally, in this embodiment, the idle speed changes with the change in the environment as described above. If, for example, the construction machine is placed at a high altitude, therefore, the basic idle speed is corrected in a direction of increasing the auto idle speed according to the environmental factors, such as the atmospheric pressure, the coolant temperature, and the fuel temperature. This eliminates the need for setting the basic idle speed on a high side at all times in advance consideration of possible reduction in the engine output due to reduced atmospheric pressure or temperature at high altitudes. This allows the basic idle speed to be set to be lower than in the case of setting the basic idle speed on a high side at all times in advance consideration of possible changes in the environment. Fuel efficiency of the construction machine can thus be improved.

One possible method for inhibiting lug-down during the reset from the auto idle state is, for example, to reduce absorption torque (capacity) of the hydraulic pump as described in Patent Document 1 cited earlier. If the capacity of the hydraulic pump is made greater from a small value after the engine speed is recovered during the reset from the auto idle state as described above, however, a flow rate of the hydraulic fluid supplied from the hydraulic actuator is decreased immediately following the reset from the auto idle state. If the hydraulic actuator is driven immediately after the reset from the auto idle state, therefore, the hydraulic actuator may respond in retard of what the operator expects. In contrast, in this embodiment, the capacity of the hydraulic pump 4 is not changed in response to the change in the environment, so that there is no likelihood that the hydraulic actuator will respond slowly during the reset from the auto idle. Thus, from this standpoint, too, a good operating feel can be maintained during the reset from the auto idle state.

The above embodiment has been described for a case in which the idle speed setting section 42 adds a positive correction gain to the basic idle speed to arrive at the idle speed. The idle speed may nonetheless be found by adding a negative correction gain to the basic idle speed (specifically, subtracting the correction gain from the basic idle speed). In this case, for example, the basic idle speed is set to be on a high side as compared with the above-described embodiment and the idle speed setting section 42 is configured such that the correction gain arithmetic section 43 calculates positive and negative correction gains, or only negative correction gains, in response to the change in the environmental factors.

DESCRIPTION OF REFERENCE NUMERALS

2: Engine
4: Hydraulic pump
6: Hydraulic actuator
8: Directional control valve
9: Control lever
11: Auto idle start switch
13: Engine control dial
23: Speed control section
26: Operating pressure sensor
27: Pressure sensor (atmospheric pressure sensor)
28: Temperature sensor (coolant temperature sensor)
29: Target speed setting section
30: Temperature sensor (fuel temperature sensor)
39: Auto idle enable switch
40: Control unit
42: Idle speed setting section
45: Auto idle control section

The invention claimed is:

1. A control unit for a construction machine, the construction machine comprising:

an engine;

a hydraulic pump driven by the engine;

a hydraulic actuator driven by hydraulic fluid delivered from the hydraulic pump;

a valve for controlling flow of the hydraulic fluid supplied from the hydraulic pump to the hydraulic actuator;

an operating device for controlling the valve by outputting an operation signal that varies according to an operation amount;

a sensor that detects a state quantity associated with an environment of the engine; and a device for inputting speed of the engine; the control unit comprising:

a section for setting a target speed of the engine to an idle speed that is lower than the speed input by the speed input device when the operating device does not output the operation signal after a lapse of a predetermined period of time; and a section for controlling speed of the engine based on the target speed set by the target speed setting section, wherein the target speed setting section includes an idle speed setting section for correcting the idle speed according to a value detected by the sensor so that an output of the engine can be prevented from being reduced due to a change in the state quantity.

2. The control unit for a construction machine according to claim 1, wherein the sensor is a sensor for detecting atmospheric pressure; and the idle speed setting section corrects the idle speed such that the idle speed increases with reduction in the atmospheric pressure detected by the pressure sensor.

3. The control unit for a construction machine according to claim 1, wherein the sensor a sensor for detecting a coolant temperature of the engine; and the idle speed setting section corrects the idle speed such that the idle speed increases with reduction in the coolant temperature detected by the coolant temperature sensor.

4. The control unit for a construction machine according to claim 1, wherein the sensor is a sensor for detecting a fuel temperature of the engine; and the idle speed setting section corrects the idle speed such that the idle speed increases with reduction in the fuel temperature detected by the fuel temperature sensor when the fuel temperature detected by the fuel temperature sensor is a first set value or less, and that the idle speed increases with an increase in the fuel temperature detected by the fuel temperature sensor when the fuel temperature is a second set value or more, the second set value being set to be greater than the first set value.

5. The control unit for a construction machine according to claim 1, further comprising:

a selector that selects whether to enable or disable the target speed setting section to set the target speed of the engine to the idle speed when the operating device does not output the operation signal over a predetermined period of time.

6. The control unit for a construction machine according to claim 2, wherein the sensor is a sensor for detecting a coolant temperature of the engine; and the idle speed setting section corrects the idle speed such that the idle speed increases with reduction in the coolant temperature detected by the coolant temperature sensor.

7. The control unit for a construction machine according to claim 2, wherein the sensor is a sensor for detecting a fuel temperature of the engine; and the idle speed setting section corrects the idle speed such that the idle speed increases with reduction in the fuel temperature detected by the fuel temperature sensor when the fuel temperature detected by the fuel temperature sensor is a first set value or less, and that the idle speed increases with an increase in the fuel temperature detected by the fuel temperature sensor when the fuel temperature is a second set value or more, the second set value being set to be greater than the first set value.

8. The control unit for a construction machine according to claim 3, wherein the sensor is a sensor for detecting a fuel temperature of the engine; and the idle speed setting section corrects the idle speed such that the idle speed increases with reduction in the fuel temperature detected by the fuel temperature sensor when the fuel temperature detected by the fuel temperature sensor is a first set value or less, and that the idle speed increases with an increase in the fuel temperature detected by the fuel temperature sensor when the fuel temperature is a second set value or more, the second set value being set to be greater than the first set value.

9. The control unit for a construction machine according to claim 2, further comprising:

a selector that selects whether to enable or disable the target speed setting section to set the target speed of the engine to the idle speed when the operating device does not output the operation signal over a predetermined period of time.

10. The control unit for a construction machine according to claim 3, further comprising:

a selector that selects whether to enable or disable the target speed setting section to set the target speed of the engine to the idle speed when the operating device does not output the operation signal over a predetermined period of time.

11. The control unit for a construction machine according to claim 4, further comprising:

a selector that selects whether to enable or disable the target speed setting section to set the target speed of the engine to the idle speed when the operating device does not output the operation signal over a predetermined period of time.

* * * * *